United States Patent
Kim et al.

(10) Patent No.: US 6,738,119 B2
(45) Date of Patent: May 18, 2004

(54) LIQUID CRYSTAL DISPLAY AND METHOD FOR MANUFACTURING THE SAME

(75) Inventors: Yong Bum Kim, Seoul (KR); Woo Hyun Kim, Seoul (KR); Jae Hong Jun, Seoul (KR)

(73) Assignee: LG.Philips LCD Co., Ltd., Seoul (KR)

( * ) Notice: Subject to any disclaimer, the term of this patent is extended or adjusted under 35 U.S.C. 154(b) by 100 days.

(21) Appl. No.: 09/964,869

(22) Filed: Sep. 28, 2001

(65) Prior Publication Data

US 2002/0054263 A1 May 9, 2002

(30) Foreign Application Priority Data

Sep. 30, 2000 (KR) .......................... 2000-57723
Dec. 29, 2000 (KR) .......................... 2000-85277

(51) Int. Cl.⁷ .......................................... G02F 1/1337
(52) U.S. Cl. ...................... 349/128; 349/123; 349/125; 349/127; 349/129; 349/133; 349/134; 257/79; 257/80; 257/82; 257/83; 257/84
(58) Field of Search ................... 349/123, 125, 349/127, 128, 129, 133, 134; 257/79, 80, 82, 83, 84

(56) References Cited

U.S. PATENT DOCUMENTS

| 4,917,471 A | * | 4/1990 | Takao et al. ................. 349/107 |
| 5,774,198 A | * | 6/1998 | Fukumoto et al. .......... 349/128 |
| 6,162,654 A | * | 12/2000 | Kawabe ........................ 438/30 |
| 6,373,543 B1 | * | 4/2002 | Cacharelis .................... 349/123 |

FOREIGN PATENT DOCUMENTS

| JP | 2001033784 A | * | 2/2001 | .......... G02F/1/1337 |
| JP | 2001281619 A | * | 10/2001 | ........... G02F/1/133 |

* cited by examiner

Primary Examiner—Tom Thomas
Assistant Examiner—Eugene Lee
(74) Attorney, Agent, or Firm—Morgan, Lewis & Bockius LLP

(57) ABSTRACT

A liquid crystal display includes a first substrate; a second substrate cohered to the first substrate with a separation from the first substrate; a first orientation film formed on an inner surface of the first substrate; a second orientation film formed on an inner surface of the second substrate; and a liquid crystal injected between the first substrate and the second substrate, wherein the first orientation film and the second orientation film are formed to face each other, and the thickness of the first orientation film or the second orientation film is formed differently in different portions.

14 Claims, 4 Drawing Sheets

LIQUID CRYSTAL DISPLAY AND METHOD FOR MANUFACTURING THE SAME

The present application claims the benefit of Korean Patent Application No. 57723/2000 filed in Korea on Sep. 30, 2000 and Korean Patent Application No. 85277/2000 filed in Korea on Dec. 29, 2000, which are hereby incorporated by reference.

BACKGROUND OF THE INVENTION

1. Field of the Invention

The present invention relates to a liquid crystal display (LCD) and a method for manufacturing the same, and more particularly, to a color liquid crystal display in which the thickness of orientation films in the LCD is adjusted to compensate for the color properties of the LCD.

2. Discussion of the Related Art

Typically, a thin film transistor liquid crystal display (TFT-LCD) includes an upper substrate and a lower substrate placed opposite to the upper substrate. The two substrates maintain a designated cell gap between them, and a liquid crystal is injected between the upper substrate and the lower substrate and sealed there-between.

FIG. 1 illustrates a structure of a TFT-LCD.

The lower substrate is formed with a polarizing plate 1, a transparent substrate 2, a TFT array 3 and an orientation film 4.

On the transparent substrate 2, a plurality of TFTs and a plurality of pixels are arranged in a matrix formation, with each pixel having a pixel electrode connected to a TFT as a basic unit. Also, a plurality of gate buslines and data buslines that are electrically connected to one another are formed at each TFT.

A gate electrode of the TFT formed around the intersecting point of the gate busline and the data busline diverges from the gate busline, and a source electrode diverges from the data busline.

The upper substrate includes a polarizing plate 5, a transparent substrate 6, a color filter 7, a common electrode 8, and an orientation film 9.

The color filter 7 has at least one of red, green and blue dyes and comprises a plurality of pixels. The common electrode 8 and the orientation film 9 are formed sequentially on the transparent substrate 6.

A sealed liquid crystal 10 is injected between the upper and lower substrates, and a spacer 11 is placed between the two substrates to maintain a constant cell gap.

In order to exhibit an intended image, the liquid crystal display having the above construction permits a voltage to be applied to the pixel and generates a voltage difference between the pixel electrode located in the pixel and the common electrode of the color filter substrate, rearranging a corresponding part of the liquid crystal.

In other words, if a voltage is applied to a gate busline and a data busline, respectively, then only the TFT where the gate voltage is applied is turned on. And the voltage of the data busline causes electric charges to be accumulated in the pixel electrode connected to a drain electrode of the TFT which has been turned on. Consequently, the voltage is applied to the liquid crystal between the pixel electrode and the common electrode only. As a result, the arrangement of liquid crystal molecules is changed and light is transmitted or blocked according to the specific arrangement. In this way, the intended image is displayed by selectively controlling the transmission or blocking the light to each pixel.

The liquid crystal display uses color filters corresponding to three primary colors of light, i.e., Red (R), Green (G) and Blue (B) in order to display a color. The RGB color filters are arrayed close to one another, and an appropriate color signal is applied to a corresponding color filter to control the luminance of light.

Once again, the procedure for displaying a color involves a number of steps. That is, the luminance of each light is controlled by changing the arrangement of the liquid crystal molecules, and the voltage necessary to drive the liquid crystal is outputted from a source driver integrated circuit (IC) and supplied through the pixel TFT.

The data voltage supplied to each pixel in this way changes the arrangement of the liquid crystal layer, which consequently affects light transmittance due to the rearranged liquid crystal layer between the upper and lower polarizing plates. Here, the number of colors that is possible to be displayed depends on the number of steps taken to control the liquid crystal. For example, in the case of NW (Normally) ECB mode, when no voltage is applied, it becomes a white state, whereas when the highest voltage is applied, it becomes a black state. Assuming that there is a color filter per pixel, if a medium voltage is applied to the color filter of the pixel, it is possible to display a medium tone according to the voltage applied, and to control the brightness and the chroma of light.

The color screen of the TFT-LCD displays a white light emitted by a back light (B/L), and a mixture of three primary colors transmitted from the R, G and B color filters through each pixel. A TFT is used to drive the liquid crystal cell of each pixel, thereby determining the amount of light transmitted by the liquid crystal cell.

The color filter is made from organic materials such as dyes or pigments. The manufacturing methods include a dye method, a dispersion method, an electro-deposition method, and a print method. The most common method among them is the pigment dispersion method, which is widely used for manufacturing the color filter of the TFT-LCD.

Normally, pigment particles are opaque because they disperse light. However, if the size of the particles is smaller than the wavelength of the light, the particles transmit light and become transparent. Thus, it is better to have smaller particles in order to obtain a high degree of transparency and an excellent dispersion property.

As explained before, the liquid crystal display is an electro-optic element driven by the voltage applied to liquid crystal molecules that are injected to the constant cell gap between the upper substrate and the lower substrate.

Therefore, it is very important to maintain a constant gap between the two substrates.

If the gap between the two substrates is not constant, the transmittance of light passing through the part is also changed, so a uniformity in the brightness in different portions of the device is not obtained.

On the other hand, even if the cell gap is maintained constant, there still could be a color balance problem.

Hereinafter, the aforementioned problem is described in more detail.

AFLC mode, ECB mode and IPS mode are sometimes called a birefringence mode because all of them take advantage of the birefringence property of light in principle. The light transmittance (T) in such a mode can be generally calculated by the following equation: $T = \mathrm{Sin}^2(2\theta) * \mathrm{Sin}^2(\delta/2)$ (wherein, $\theta$ is an angle between a transmission axis of a polarizing plate to the side of an incident light and the liquid crystal direction; δ (phase contrast)=$2\pi d^* \Delta n_{eff}/\lambda$; d is a cell gap; $\Delta n_{eff}$ is an effective refractive index; and X is a wavelength of light).

From the equation, it is apparent that the transmittance (T) is related to the cell gap (d), the wavelength of light (λ) and a structure of the liquid crystal layer. Looking at the transmittance properties at each color pixel according to the applied voltage and assuming that the cell gap (d) stays constant, it is found from the light transmittance T=$Sin^2(2\theta)$ *$Sin^2(\delta/2)$ that the phase difference is different for each color even with the same arrangement of the liquid crystal layer. Consequently, the transmittance in gray levels are different for each color. Therefore, the color balance in gray levels is destroyed. In addition, the voltage required for generating the maximum transmittance is differently applied to each R, G and B pixel, making it more difficult to achieve the optimum white light in general. One of the attempts made to solve this problem is to apply different cell gaps to the R, G and B pixels, respectively.

As shown in the equation described above, i.e., δ=$2\pi d^* \Delta n_{eff}/\lambda$, in order to make the phase difference (δ) equal, the cell gap of each color pixel should be optimized respectively, that is, as the wavelength gets longer, the value of $d^* \Delta n_{eff}$ should be larger also. However, since $\Delta n_{eff}$ depends on the medium properties, the cell gap (d) is a variable that can be changed. Thus, the cell gap (d) should be larger to maintain the phase difference at the same value even when the wavelength becomes longer. In other words, if the cell gap (d) is different for each color, the transmittance difference in gray levels during applying the voltage and the color balance problem thereof can be solved together.

FIG. 2 shows the main parts of the liquid crystal display in the related art where the cell gap (d) is different for each R, G or B color. Here, the liquid crystal display includes two transparent substrates 201 and 202 that oppose each other, two orientation films 208 and 209 between the substrates, a spacer 205 between the orientation films to maintain a designated gap where liquid crystal 206 is injected and sealed, and a color filter 207 (R, G, B) with different thicknesses, respectively, in compensation for color balance.

Namely, when applying the voltage to the liquid crystal, the color balance in the middle gray is sometimes lost because of the slope of transmittance of each color ($T_R$, $T_G$, $T_B$) is different from one another. The problem is overcome by varying the cell gap of each color ($d_R$, $d_G$, $d_B$).

Unfortunately, since the technology of the related art differentiates the thicknesses of each color filter from one another as a way of reinforcing color properties, it is not appropriate to obtain the gap uniformity and the orientation stability because of a big step in the R, G and B pixels, respectively. When the orientation is unstable for the reason stated above, any unnecessary small domain can be generated, and the orientation itself during rubbing is not easily done when compared with the flat substrate. Moreover, the orientation around the borders having the above-mentioned step is relatively unstable compared with other surrounding areas, generating a disclination between the domains and consequently decreasing C/R.

SUMMARY OF THE INVENTION

Accordingly, the present invention is directed to a liquid crystal display that substantially obviates one or more of the problems due to limitations and disadvantages of the related art.

An object of the present invention is to provide a liquid crystal display and a method for manufacturing the same in order to improve color properties by varying thicknesses of orientation films positioned to correspond to respective R, G and B color filters in the liquid crystal display.

Another object of the present invention is to provide of a liquid crystal display and a method for manufacturing the same in order to compensate and improve color properties by varying liquid crystal motions in each pixel that displays each color when applying an equal voltage to each pixel. This is accomplished by making similar the thicknesses of R, G and B color filters on an upper substrate in the liquid crystal display to maintain the flat substrate, and by varying the thicknesses of orientation films positioned to correspond to respective R, G and B color filters in the liquid crystal display.

Yet another object of the present invention is to provide a liquid crystal display and a method for manufacturing the same in order to improve color properties by adjusting the thickness of an orientation film in the liquid crystal display, thereby maintaining gap uniformity by using a uniform color filter pigment concentration and securing an excellent orientation film stability. Another object of the present invention is to provide a color liquid crystal display in which characteristics of each color are reinforced by balancing the colors through decreasing transmittance differences in a middle gray area of red, green and blue, respectively, taking advantage of a different thickness of an orientation film that is typically observed in a liquid crystal with a large spontaneous polarization which is one of characteristics of ferroelectric liquid crystal (FLC) phase in a color liquid display crystal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the liquid crystal display includes a first substrate; a second substrate; which is cohered to the first substrate with a designated separation; a first orientation film formed on an inner side of the first substrate; a second orientation film formed on an inner side of the second substrate; and a liquid crystal injected between the first substrate and the second substrate, wherein the first orientation film and a second orientation film are formed to face each other, and the thickness of the first orientation film is different from thickness of the second orientation film.

In another aspect, a method for manufacturing the liquid crystal display described above includes forming a first orientation film on a first substrate and a second orientation film on a second substrate; varying a thickness of the first orientation film or the second orientation film per a constant unit; applying an alignment treatment on the first orientation film and the second orientation film, respectively; bonding the first substrate to the second substrate with a cell gap; and injecting the liquid crystal between the first substrate and the second substrate.

In the present invention, the elements of each color filter are R, G and B, respectively, and the thickness of the orientation film corresponding to the same satisfies the relation of R<G<B.

In addition, the thicknesses of the R, G and B color filters on the upper substrate of the liquid crystal display are adjusted such that there is only a very small difference in the thicknesses in order to maintain the flatness of the upper substrate. And, the orientation films corresponding to the color filters are formed on the opposite transparent substrate having the liquid crystal in-between.

The orientation films are formed by steps of dry etching using a photoresist and have different thicknesses.

Another embodiment of the present invention provides a method for forming an orientation film with a different thickness and a designated step by coating the orientation film several times.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Figure 1:
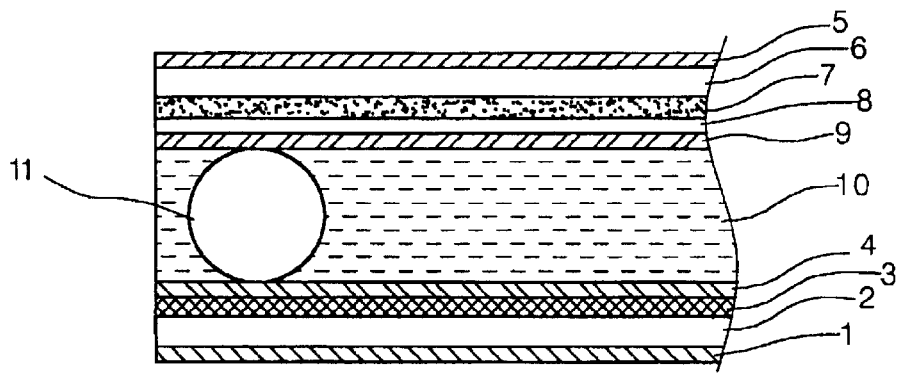
FIG. 1 is a cross sectional view of a related art liquid crystal display.
Figure 2:
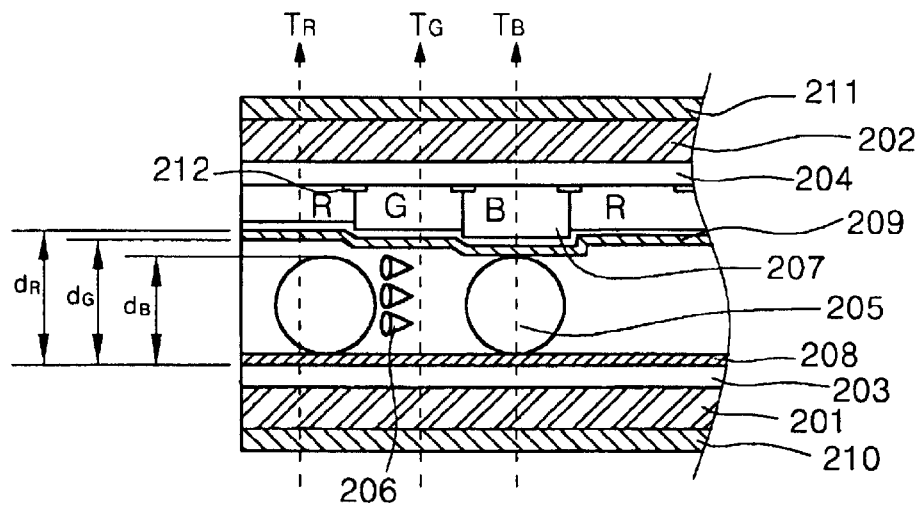
FIG. 2 is a cross sectional view of a multi-gap technology used for improving a color balance in a related art liquid crystal display.

Reference will now be made in detail to the preferred embodiments of the present invention, examples of which are illustrated in the accompanying drawings.

In the following description, the same drawing reference numerals are used for the same elements in different drawings. The matters defined in the description are nothing but the ones provided to assist in a comprehensive understanding of the invention. Thus, it is apparent that the present invention can be carried out without those defined matters. Also, well-known functions or constructions are not described in detail since they would obscure the invention in unnecessary detail.

Figure 3:
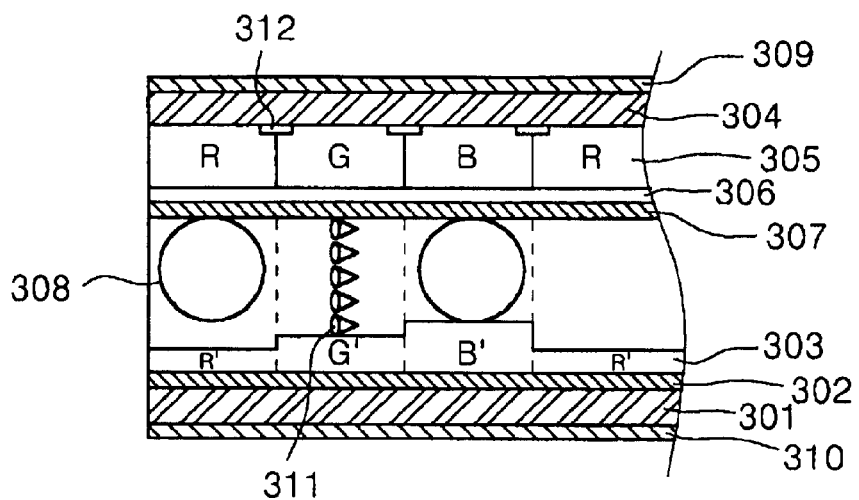
FIG. 3 is a cross sectional view showing a liquid crystal display according to a preferred embodiment of the present invention.

FIG. 3 is a cross sectional view showing a liquid crystal display according to a preferred embodiment of the present invention.

Referring to FIG. 3, the liquid crystal display according to the present invention includes a lower substrate having a pixel electrode 302 which includes a TFT array formed on a transparent substrate 301 and an orientation film 303 formed on the pixel electrode 302. An upper substrate including a color filter array 305 is formed on a transparent substrate 304, and a common electrode 306 and an orientation film 307 are formed in subsequence on the color filter array 305. A spacer 308 and a sealant (not shown) are placed between the substrates, and a ferroelectric liquid crystal 311 is injected between the substrates. Polarizing plates 309, 310 are formed outside the upper and lower substrates, respectively.

Here, the thicknesses of each portion of the orientation film 303 that faces a respective color (R, G and B) of the individual color filter 305 are different. The thicknesses of R, G and B, color filters are, however, very close to one another in order to maintain the flatness of the upper substrate.

On the other hand, the thickness of an orientation film R', corresponding to a first color pigment R, an orientation film G', corresponding to a second color pigment G, and an orientation film B', corresponding to a third color pigment B, respectively, satisfies the relation of R'<G'<B', having designated thicknesses to keep up with the color balance by minimizing the transmittance difference in a middle gray level of each color when applying the equal voltage to each pixel.

Here, the cell gap may be, for example, approximately 1.5 $\mu$m to 2 $\mu$m, while the thickness of the orientation film ranges over several hundred Å for the change because this kind of thickness is more than enough to yield an intended color property compensation effect.

Moreover, since each orientation film of R', G'and B' does not have a big step, it is easy to enhance the orientation stability and the cell gap uniformity.

Similar to FIG. 3, FIG. 4 illustrates a preferred embodiment of a process for manufacturing the liquid crystal display according to the present invention that can reinforce color properties by varying the thickness of the orientation.

Figure 4A:
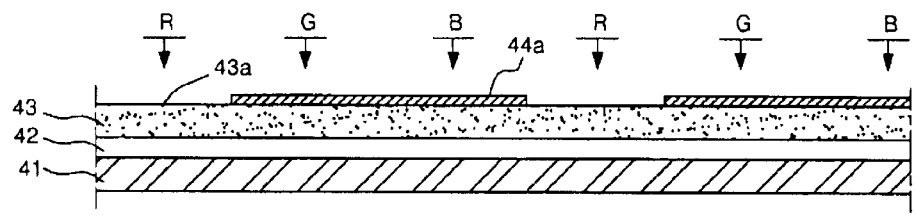
FIGS. 4A to 4C are cross sectional views showing different phases of a process for manufacturing a liquid crystal display according to a preferred embodiment of the present invention.

As shown in FIG. 4A, a TFT array 42 is formed on a transparent substrate 41 and an orientation film 43 coats the TFT array 42.

Here, the transparent substrate 41 can be a glass plate. In the TFT array 42, a plurality of pixels having a TFT and a pixel electrode connected to the TFT as a basic unit, are arrayed in a matrix formation, and a plurality of gate buslines and data buslines are electrically connected to each TFT.

The gate electrode of the TFT formed around the intersection of the gate busline and the data busline diverges from the gate busline, and the source electrode diverges from the data busline.

On the other hand, on the orientation film 43, a photoresist 44a is formed in the regions except for the region corresponding to R pigment 43a among other pigments of the color filters, and using the photoresist 44a as a mask, a dry etching process is carried out to etch the orientation film positioned opposite to the R pigment 43a to a designated thickness.

Figure 4B:
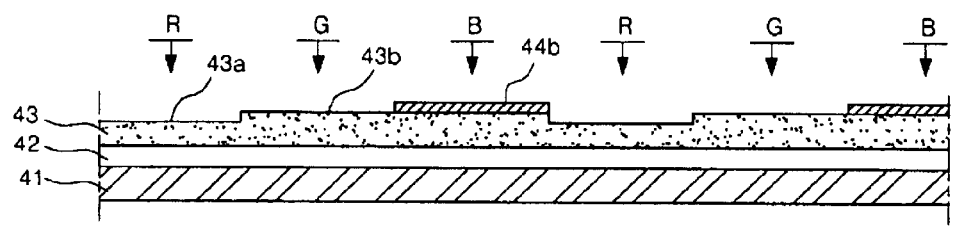
Figure 4C:
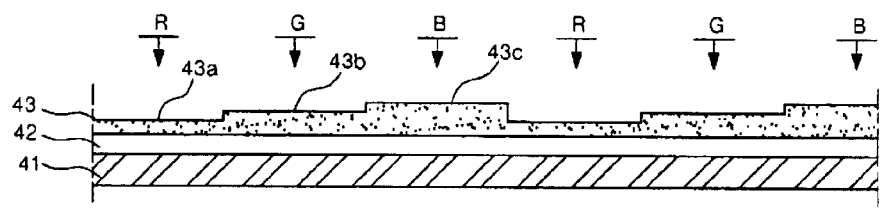

Next, as shown in FIG. 4B, a photoresist 44b is formed in the regions except for the regions corresponding to R pigment 43a and G pigment 43b, and using the photoresist 44b as a mask, a dry etching process illustrated in FIG. 4C is carried out to etch the orientation film positioned opposite to R and G pigments to a designated thickness.

Through this process, the respective regions corresponding to R pigment 43a, G pigment 43b and B pigment 43c have orientation films of different thicknesses.

Thereafter, a rubbing treatment is performed on the orientation films arrayed in each pixel in which the TFT array is formed. The rubbing treatment is also performed on the orientation film of the upper substrate formed with the color filter, the common electrode and the orientation film arrayed in sequence on the transparent substrate. Finally, the upper substrate and the lower substrate are cohered and the liquid crystal is injected between the substrates and sealed, thereby completing the construction of the liquid crystal display device of the present invention with improved color properties based on the adjustment of the thicknesses of the orientation films.

Since the compensation of color properties is accomplished by varying the thicknesses of the orientation films, an LCD device of the present invention can improve color properties while maintaining the cell gap uniformity by using a uniform pigment concentration. In addition, the secured uniformity of the orientation film enables the compensation of colors without any sacrifice from the orientation stability.

Similar to FIG. 3, FIGS. 5A through 5C illustrate another embodiment of the process for manufacturing the liquid crystal display according to the present invention for reinforcing color properties by varying the thickness of the orientation film.

Figure 5A:
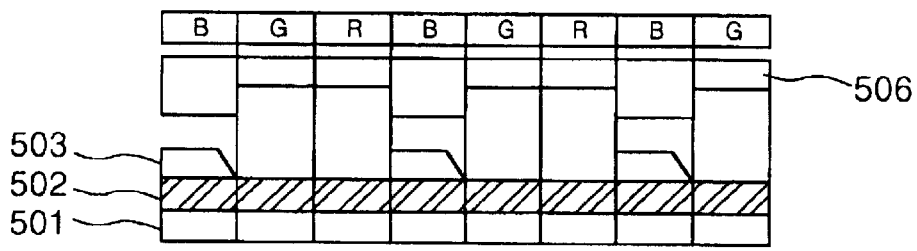
FIGS. 5A to 5C are sectional views showing different phases of a process for manufacturing a liquid crystal display according to another preferred embodiment of the present invention.

According to FIG. 5A, an orientation film 503 is formed through a roll coating process on a lower substrate 501 where a TFT array 502 is formed. Here, a resin plate 506 used in the roll coating process may be patterned in such way that the orientation film 503 can be positioned on the region of pixel B only.

After the process of forming the orientation film, the solvent remaining in the film is eliminated by baking the orientation film.

Figure 5B:
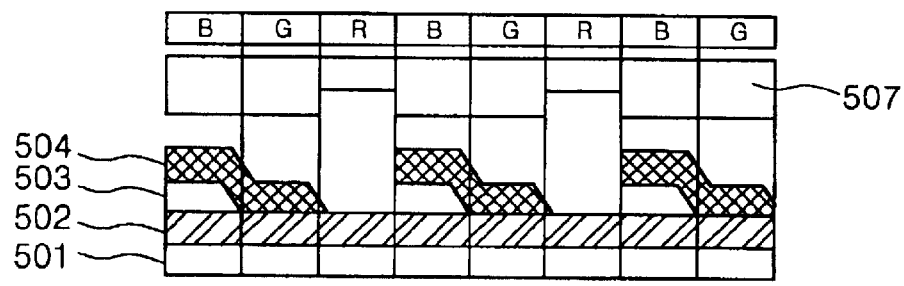

As shown in FIG. 5B, the roll coating process is performed on the lower substrate 501 where the TFT array 502 is formed and on the orientation film 503, so that an additional orientation film 504 is formed only on the regions of B and G pixels.

Here, the resin plate 507 employed in the rolling coating process may be patterned in such a way that the orientation film 504 can be positioned on the regions of B and G pixels only.

Again, after the process of forming the orientation film, the solvent remaining in the film is eliminated by baking the orientation film.

Figure 5C:
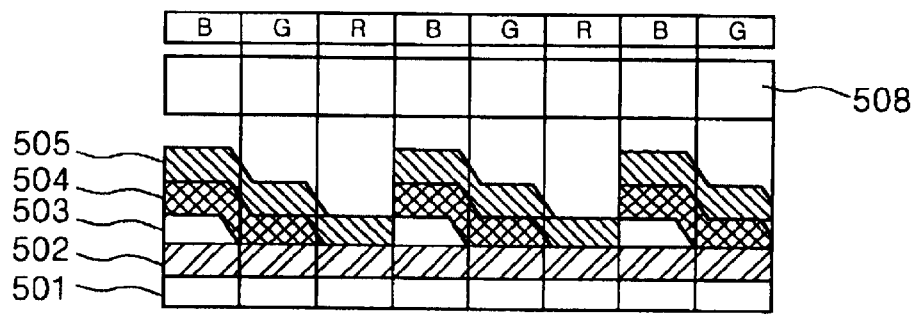

FIG. 5C illustrates an orientation film 505 that is additionally formed on the entire active region on the lower substrate 501 where the TFT array 502 is formed, and on the orientation film 503 through the roll coating process.

Here, the resin plate employed in the roll coating process is patterned in such a way that the orientation film 505 can be positioned on the entire active region. Similarly, the solvent remaining in the film is eliminated by baking the orientation film after the process of forming the orientation film. After this, an alignment treatment is performed on the orientation film of the lower substrate by means of rubbing.

As explained above, the method of adjusting the thicknesses of the orientation films to compensate for the color properties is advantageous in that the method provides an excellent orientation stability and cell gap uniformity, compared with the method for adjusting the thicknesses of the color filters found in the related art.

In addition, the flatness of the orientation layer is much better than that of the related art.

Although the embodiments of the present invention only illustrate a liquid crystal display and the manufacturing method thereof by varying the thickness of the orientation film of the lower substrate where the TFT array is formed, the present invention is not limited to the case of making the thickness of the orientation film of the TFT array substrate different for each pixel corresponding to a color. In addition, the method can be applied not only to the C/F substrate, but also the C/F substrate and the TFT array substrate.

It will be apparent to those skilled in the art that various modifications and variations can be made in the liquid crystal display of the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
a first substrate;
a second substrate cohered to the first substrate with a separation from the first substrate;
a first orientation film formed on an inner surface of the first substrate;
a second orientation film formed on an inner surface of the second substrate;
a color filter comprising red, green, and blue regions is formed between the first substrate and the first orientation film; and
a liquid crystal injected between the first substrate and the second substrate,
wherein first, second, and third thicknesses of the second orientation film corresponding to the blue, green and red regions are each different.

2. The liquid crystal display of claim 1, wherein the first thickness of the second orientation film corresponding to the blue region is larger than the second thickness of the second orientation film corresponding to the green region.

3. The liquid crystal display of claim 1, wherein the first thickness of the second orientation film corresponding to the blue region is larger than the third thickness of the second orientation film corresponding to the red region.

4. The liquid crystal display of claim 1, wherein the second thickness of the second orientation film corresponding to the green region is larger than the third thickness of the second orientation film corresponding to the red region.

5. The liquid crystal display of claim 1, wherein the liquid crystal is a ferroelectric liquid crystal.

6. The liquid crystal display of claim 1, wherein an orientation direction of the first orientation film and the second orientation film is either parallel or anti-parallel.

7. The liquid crystal display of claim 1, wherein the first, second, and third thicknesses differ from each other by approximately 0.01 to 0.1 $\mu$m.

8. The liquid crystal display of claim 1, wherein the liquid crystal is formed between the color filter and the second orientation film.

9. A liquid crystal display, comprising:
a first substrate;
a second substrate cohered to the first substrate with a separation from the first substrate;
a first orientation film formed on an inner surface of the first substrate;
a second orientation film formed on an inner surface of the second substrate;
a color filter including red, green, and blue formed between the first substrate and the first orientation film; and
a liquid crystal material injected between the first substrate and the second substrate,
wherein a first thickness of the second orientation film corresponding to the blue color filter is larger than a second thickness of the second orientation film corresponding to the green color filter.

10. The liquid crystal display of claim 9, wherein the liquid crystal is formed between the color filter and the second orientation film.

11. A liquid crystal display, comprising:

a first substrate;

a second substrate cohered to the first substrate with a separation from the first substrate;

a first orientation film formed on an inner surface of the first substrate;

a second orientation film formed on an inner surface of the second substrate;

a color filter including red, green, and blue formed between the first substrate and the first orientation film; and a liquid crystal material injected between the first substrate and the second substrate, wherein a second thickness of the second orientation film corresponding to the green color filter is larger than a third thickness of the second orientation film corresponding to the red color filter.

12. The liquid crystal display of claim 11, wherein the liquid crystal is formed between the color filter and the second orientation film.

13. A liquid crystal display, comprising:

a first substrate;

a second substrate cohered to the first substrate with a separation from the first substrate;

a first orientation film formed on an inner surface of the first substrate;

a second orientation film formed on an inner surface of the second substrate;

a color filter including red, green, and blue formed between the first substrate and the first orientation film; and a liquid crystal material injected between the first substrate and the second substrate, wherein a first thickness of the second orientation film corresponding to the blue color filter is larger than a second thickness of the second orientation film corresponding to the green color filter and a third thickness of the second orientation film corresponding to the red color filter.

14. The liquid crystal display of claim 13, wherein the liquid crystal is formed between the color filter and the second orientation film.

* * * * *